United States Patent
Shin et al.

(10) Patent No.: US 11,663,980 B2
(45) Date of Patent: May 30, 2023

(54) DISPLAY DEVICE AND PERSONAL IMMERSIVE SYSTEM AND MOBILE TERMINAL SYSTEM USING THE SAME

(71) Applicant: LG DISPLAY CO., LTD., Seoul (KR)

(72) Inventors: Sun Kyung Shin, Paju-si (KR); Bong Choon Kwak, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/741,592

(22) Filed: May 11, 2022

(65) Prior Publication Data

US 2022/0383824 A1 Dec. 1, 2022

(30) Foreign Application Priority Data

May 28, 2021 (KR) .......................... 10-2021-0068873

(51) Int. Cl.
*G09G 3/3275* (2016.01)
*G06F 3/01* (2006.01)
(Continued)

(52) U.S. Cl.
CPC ........... *G09G 3/3275* (2013.01); *G06F 3/013* (2013.01); *G09G 3/2007* (2013.01); *G09G 3/3233* (2013.01); G09G 2310/027 (2013.01); G09G 2310/0291 (2013.01); G09G 2310/0294 (2013.01); G09G 2310/08 (2013.01); G09G 2320/0686 (2013.01); G09G 2330/021 (2013.01); G09G 2330/06 (2013.01); G09G 2340/0407 (2013.01); G09G 2354/00 (2013.01)

(58) Field of Classification Search
CPC .... G09G 3/3275; G09G 3/013; G09G 3/2007; G09G 3/3233; G09G 2310/027; G09G 2310/0291; G09G 2310/0294; G09G 2310/08; G09G 2320/0686; G09G 2330/021; G09G 2330/06; G09G 2340/0407; G09G 2354/00
USPC ........................................................ 345/156
See application file for complete search history.

(56) References Cited

U.S. PATENT DOCUMENTS

| | | | |
|---|---|---|---|
| 2003/0146897 A1* | 8/2003 | Hunter | G09G 3/342 345/102 |
| 2016/0155401 A1* | 6/2016 | Lee | G09G 3/3607 345/694 |

(Continued)

FOREIGN PATENT DOCUMENTS

| KR | 10-2016-0060254 A | 5/2016 |
|---|---|---|
| KR | 10-2019-0003334 A | 1/2019 |
| KR | 10-2020-0142539 A | 12/2020 |

*Primary Examiner* — Tom V Sheng
(74) *Attorney, Agent, or Firm* — Polsinelli PC

(57) ABSTRACT

In a display device and a personal immersive system and a mobile terminal system using the same, at least a part of the display panel includes a switch element configured to electrically connect adjacent sub-pixels to each other in response to a first logic value of a control signal, and electrically separate the adjacent sub-pixels from each other in response to a second logic value of the control signal, a display driver applies the second logic value of the control signal to the switch element when receiving pixel data to be written to a focal region on the display panel to which a user's gaze is directed, and applies the first logic value of the control signal to the switch element when receiving pixel data to be written to a non-focal region on the display panel.

18 Claims, 18 Drawing Sheets

(51) Int. Cl.
*G09G 3/3233* (2016.01)
*G09G 3/20* (2006.01)

(56) References Cited

U.S. PATENT DOCUMENTS

2018/0130420 A1* 5/2018 Gao .................... G09G 3/3258
2019/0362667 A1* 11/2019 Ma ..................... G06V 40/1318
2020/0183239 A1* 6/2020 Yabuki .................... G09G 3/36
2020/0402477 A1* 12/2020 Jiang ....................... G06F 3/013
2021/0035501 A1* 2/2021 Feng .................... G09G 3/3283

* cited by examiner

DISPLAY DEVICE AND PERSONAL IMMERSIVE SYSTEM AND MOBILE TERMINAL SYSTEM USING THE SAME

CROSS-REFERENCE TO RELATED APPLICATION

This application claims the priority of Korean Patent Application No. 10-2021-0068873 filed on May 28, 2021, which is hereby incorporated by reference in its entirety.

BACKGROUND

Field of the Disclosure

The present disclosure relates to a display device and a personal immersive system and a mobile terminal system using the same.

Description of the Background

Virtual reality technology is developing the fastest in defense, architecture, tourism, film, multimedia, and game fields. Virtual reality refers to a specific environment or situation that feels similar to the real environment using stereoscopic image technology.

Personal immersive devices have been developed in various forms, such as a head mounted display (HMD), a face mounted display (FMD), and an eyeglasses-type display (EGD). The personal immersive devices are divided into a virtual reality (VR) device and an augmented reality (AR) device.

Although there have been various studies on reducing power consumption in the personal immersive devices without degrading perceived image quality, the power consumption could not be reduced to a satisfactory level.

SUMMARY

Accordingly, the present disclosure is to solve the aforementioned needs and/or problems.

More specifically, the present disclosure is to provide a personal immersive system and a mobile terminal system capable of reducing power consumption without degrading perceived image quality.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display device include a display panel in which a plurality of data lines, a plurality of gate lines, and a plurality of sub-pixels electrically connected to the data lines and the gate lines are arranged; and a display driver configured to drive the display panel by writing pixel data to the sub-pixels.

At least a part of the display panel includes a switch element configured to electrically connect adjacent sub-pixels to each other in response to a first logic value of a control signal, and electrically separate the adjacent sub-pixels from each other in response to a second logic value of the control signal.

The display driver is configured to apply the second logic value of the control signal to the switch element when receiving pixel data to be written to a focal region on the display panel to which a user's gaze is directed.

The display driver is configured to apply the first logic value of the control signal to the switch element when receiving pixel data to be written to a non-focal region other than the focal region on the display panel.

In another aspect of the present disclosure, a personal immersive system includes a system controller configured to lower resolution of an input image in a non-focal region, which is outside a focal region, than in the focal region to which a user's gaze is directed; and a display driver configured to write pixel data of the focal region and pixel data of the non-focal region to pixels of a display panel, supply a black grayscale voltage to at least some of pixels of the non-focal region on the display panel, and generate a control signal for lowering luminance of the non-focal region than luminance of the focal region.

In a further aspect of the present disclosure, a mobile terminal system include a system controller configured to lower resolution of an input image in a non-focal region, which is outside a focal region, than in the focal region to which a user's gaze is directed; and a display driver configured to write pixel data of the focal region and pixel data of the non-focal region to pixels of a display panel, supply a black grayscale voltage to at least some of pixels of the non-focal region on the display panel, and generate a control signal for lowering luminance of the non-focal region than luminance of the focal region.

In each of the personal immersive system and the mobile terminal system, at least a part of a screen of the display panel may include a switch element configured to connect adjacent sub-pixels to each other in response to a first logic value of the control signal and separate the adjacent sub-pixels from each other in response to a second logical value of the control signal.

In the present disclosure, pixels in the non-focal region outside the focal region to which the user's gaze is directed may be driven in a lump using the switch element, and a black grayscale voltage may be applied to some of the pixels in the non-focal region, thereby lowering the luminance of the non-focal region that does not perceived by the user to reduce power consumption without degrading image quality. Since the focal region is reproduced in high resolution on the display panel, there is little deterioration in image quality perceived by the user.

In the present disclosure, power consumption and electromagnetic interference (EMI) may be reduced by lowering the amount of pixel data transmitted to a data driver and the number of transitions in the non-focal region.

Effects of the present disclosure are not limited to those mentioned above, and other effects not mentioned will be clearly understood by those skilled in the art from the description of the claims.

BRIEF DESCRIPTION OF THE DRAWINGS

The above features and advantages of the present disclosure will become more apparent to those of ordinary skill in the art by describing exemplary aspects thereof in detail with reference to the attached drawings, in which.

DETAILED DESCRIPTION

Figure 1:
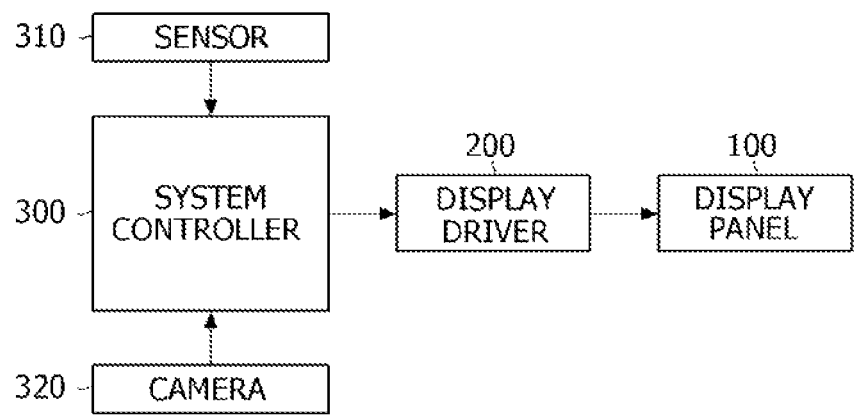
FIG. 1 is a block view schematically illustrating a display device according to an aspect of the present disclosure.

The advantages and features of the present disclosure and methods for accomplishing the same will be more clearly understood from aspects described below with reference to the accompanying drawings. However, the present disclosure is not limited to the following aspects but may be implemented in various different forms. Rather, the present aspects will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the aspects of the present disclosure are merely examples, and the present disclosure is not limited thereto. Like reference numerals generally denote like elements throughout the present disclosure. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The same reference numerals may refer to substantially the same elements throughout the present disclosure.

The following aspects can be partially or entirely bonded to or combined with each other and can be linked and operated in technically various ways. The aspects can be carried out independently of or in association with each other.

In the following description, when it is determined that a detailed description of a known function or configuration related to the present disclosure may unnecessarily obscure the gist of the present disclosure, the detailed description thereof will be omitted.

Hereinafter, various aspects of the present disclosure will be described in detail with reference to the accompanying drawings.

Figure 2:
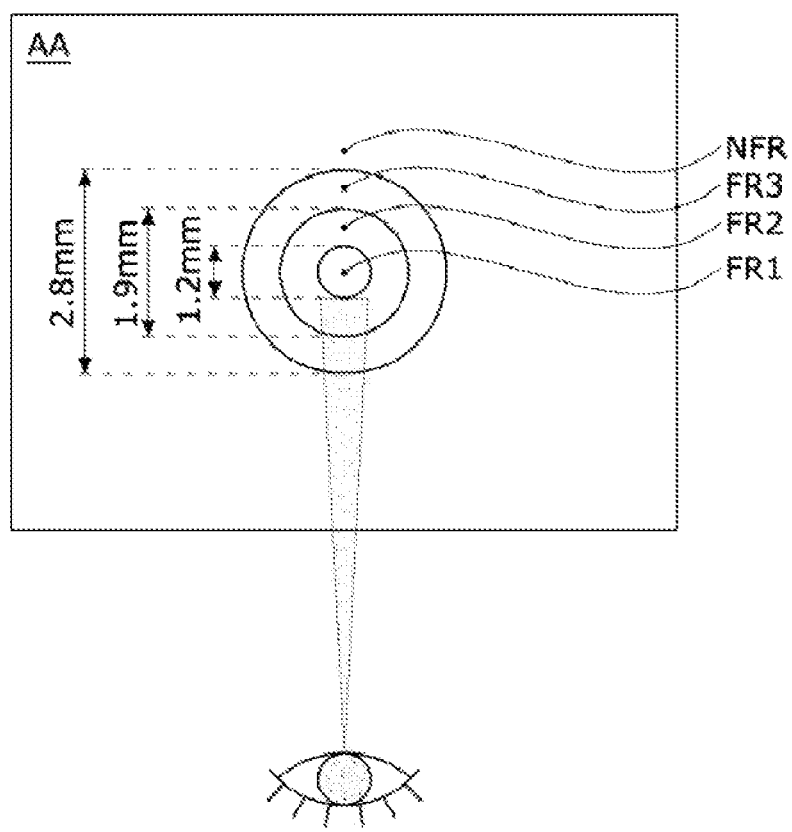
FIG. 2 is a diagram illustrating a focal region on a screen.

Referring to FIGS. 1 and 2, a display device of the present disclosure includes a display panel 100, a system controller 300, a display driver 200, and the like.

The system controller 300 may include a main circuit board of a television (TV) system, a computer system, a set-top box, a navigation system, a mobile terminal system, a wearable system, or a virtual/augmented reality system (hereinafter referred to as "VR/AR system"). Hereinafter, it should be noted that the system controller 300 is mainly described based on a virtual reality system, but is not limited thereto.

The system controller 300 is connected to a sensor 310, a camera 320, and the like. The system controller 300 further includes an external device interface connected to a memory or an external video source, a user interface for receiving a user command, a power supply for generating power, and the like. The external device interface, the user interface, the power supply, and the like are omitted from the drawings. The system controller 300 adjusts the resolution of a focal region and a non-focal region by using a graphic image processing unit such as a graphic processing unit (GPU) that performs image processing of an input image. The external device interface may be implemented with various well-known interface modules, such as a universal serial bus (USB) and a high definition multimedia interface (HDMI).

The system controller 300 transmits pixel data of the input image and a timing signal synchronized thereto to the display driver 200. The system controller 300 analyzes image data from the camera 320 that captures user's left and right eyes with a preset eye tracking algorithm to estimate the focal region to which the user's left and right eyes are directed. The system controller 300 adjusts the resolution of the input image in the focal region and the non-focal region outside the focal region by using a foveated rendering algorithm. The system controller 300 converts the pixel data resolution of the input image according to the resolution of the focal region and the non-focal region by using a scaler.

In the case of the VR/AR system, since the user's eyes are very close to a screen AA of the display panel 100, a high resolution greater than or equal to 4K is required. The foveated rendering algorithm may increase the resolution of pixel data corresponding to the focal region displayed on the display panel 100 by using the position information of the pupils, and may reduce the amount of transmitted data and the number of transitions by repeatedly constructing the same data on a predetermined pixel block basis in the non-focal region other than the focal region. The foveated rendering algorithm may reduce the amount of data transmitted to the display driver 200 by 80% or more by encoding pixel data to be written to the pixels of the focal region into a representative value.

The system controller 300 may transmit high-resolution data to the display driver 200 by increasing or without lowering the resolution of the pixel data to be written to the pixels of the focal region on the display panel 100. In this regard, the system controller 300 may gradually or stepwisely lower the resolution of the pixel data from the center of the focal region to the edge thereof. The system controller 300 significantly lowers the resolution of the non-focal region to reduce the data transmission amount and the number of transitions.

In the VR/AR system, due to the intrinsic characteristics of the optic nerve, the user can only perceive a low-resolution image reproduced in the pixels of the non-focal region other than the focal region. A resolution compression range that will not degrade perceived image quality while lowering the data transmission amount may be set as shown in FIG. 2.

In the VR system, the focal region may be set to a size having a diameter of 2.8 mm in consideration of the distance between the user's pupils and the screen AA. The focal region may be divided into N (N being a positive integer greater than or equal to 2) regions from the center to the edge. In the case where the focal region is divided into three regions having different resolutions, if the pixel data resolution of a first region FR1 corresponding to the center of the focal region is 100%, the pixel data resolution of a second region FR2 outside the first region FR1 may be reduced to 25%, and the pixel data resolution of a third region FR3 outside the second region FR2 may be reduced to 11.1%. The resolution of a non-focal region NFR may be 6.2%. The diameter of the first region FR1 may be set to 1.2 mm, the diameter of the second region FR2 may be set to 1.9 mm, and the diameter of the third region FR3 may be set to 2.8 mm, but they are not limited thereto. In the VR system, the focal region may be approximately 2% of the entire screen AA.

The sensor 310 includes various sensors such as a gyro sensor and an acceleration sensor. The sensor 310 transmits the outputs of the various sensors to the system controller 300. The system controller 300 may receive the output of the sensor 310 and move the pixel data of the image displayed on the screen AA in synchronization with the user's movement. Accordingly, the position of the focal region on the screen AA may be changed in synchronization with the movement of the user's pupils and head.

Figure 3:
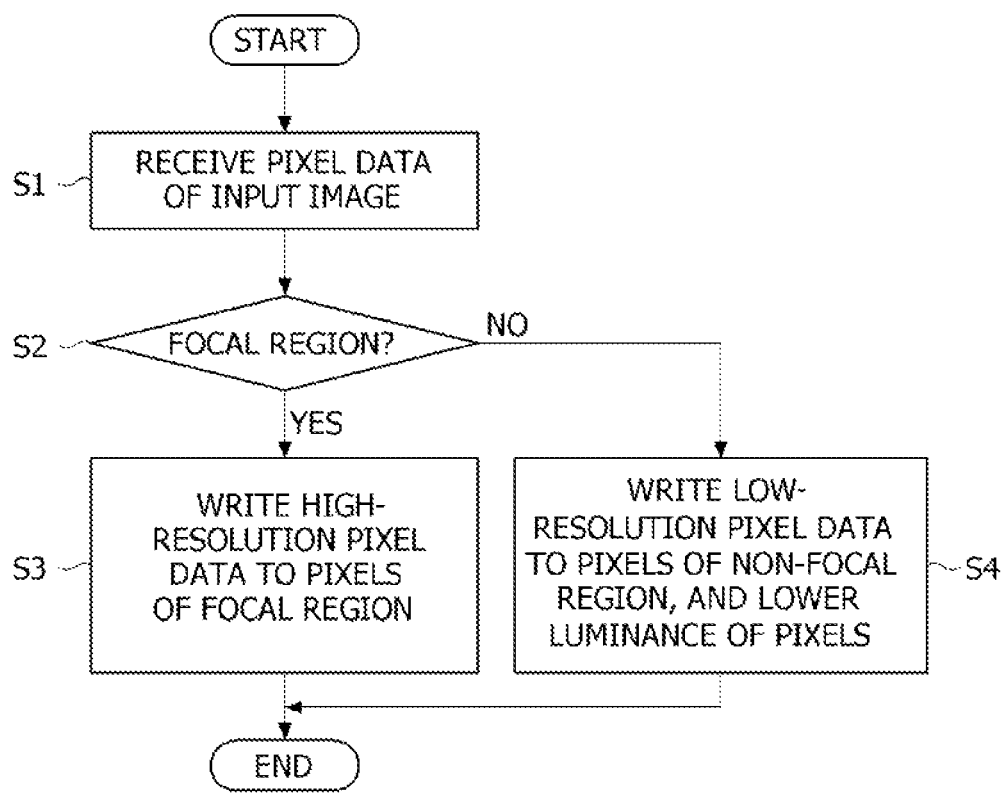
FIG. 3 is a flowchart illustrating an operation of a display driver.

As shown in FIG. 3, when receiving the pixel data of the input image from the system controller 300 through an interface receiving circuit (step S1), the display driver 200 writes the pixel data into the pixels of the display panel 100. The display driver 200 may lower the luminance of the pixel data written to the pixels of the non-focal region to reduce power consumption.

The display driver 200 writes high-resolution pixel data into the pixels of the focal region on the screen AA of the display panel 100 (steps S2 and S3). The resolution of the pixel data within the focal region may be gradually or stepwisely lowered from the center to the edge. On the other hand, the display driver 200 writes low-resolution pixel data into the pixels of the non-focal region outside the focal region, and lowers the luminance of the non-focal region than that of the focal region (steps S2 and S4).

Figure 4A:
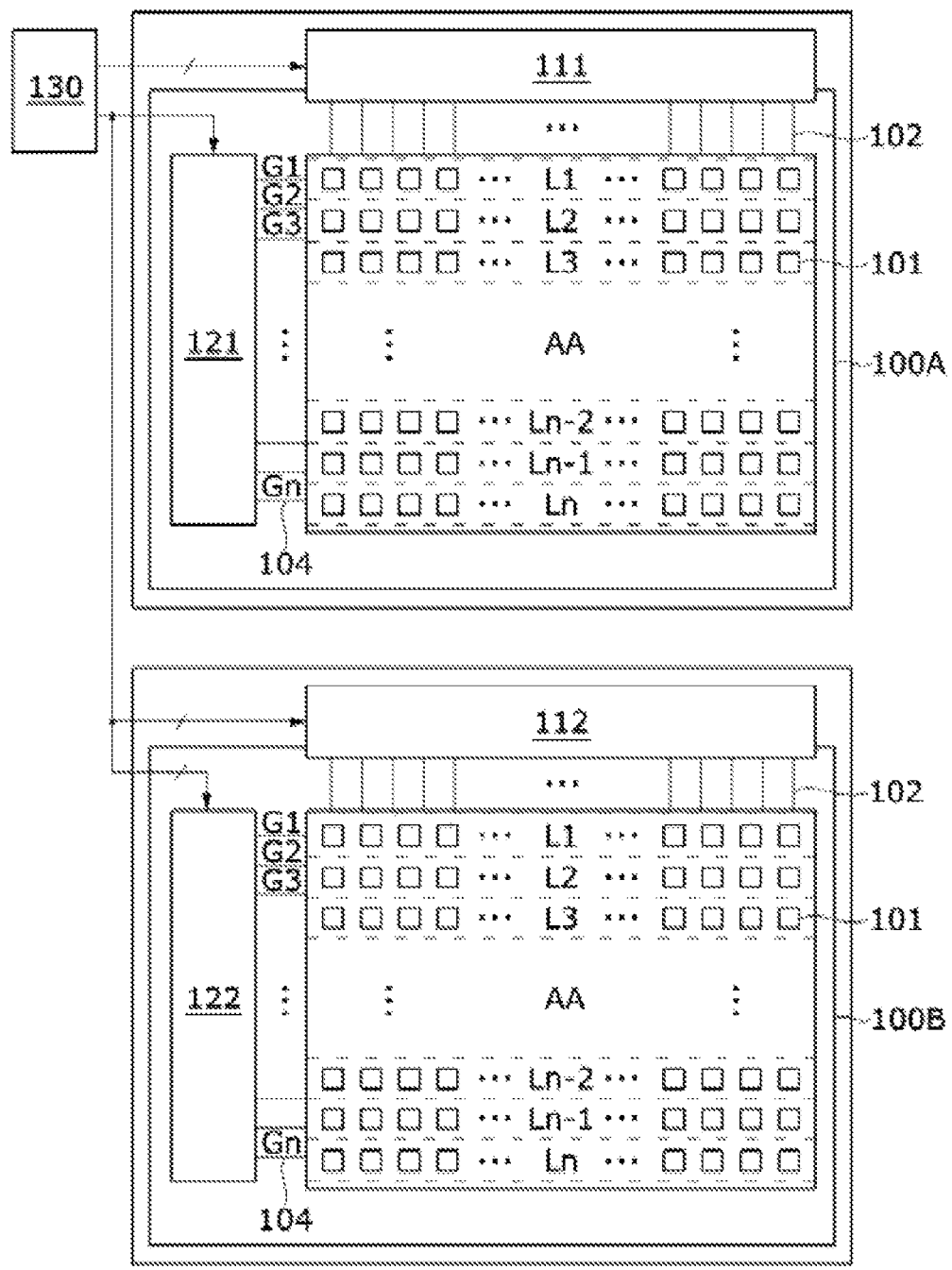
FIGS. 4A and 4B are diagrams illustrating a display driver and a display panel shown in FIG. 1 in detail.
Figure 4B:
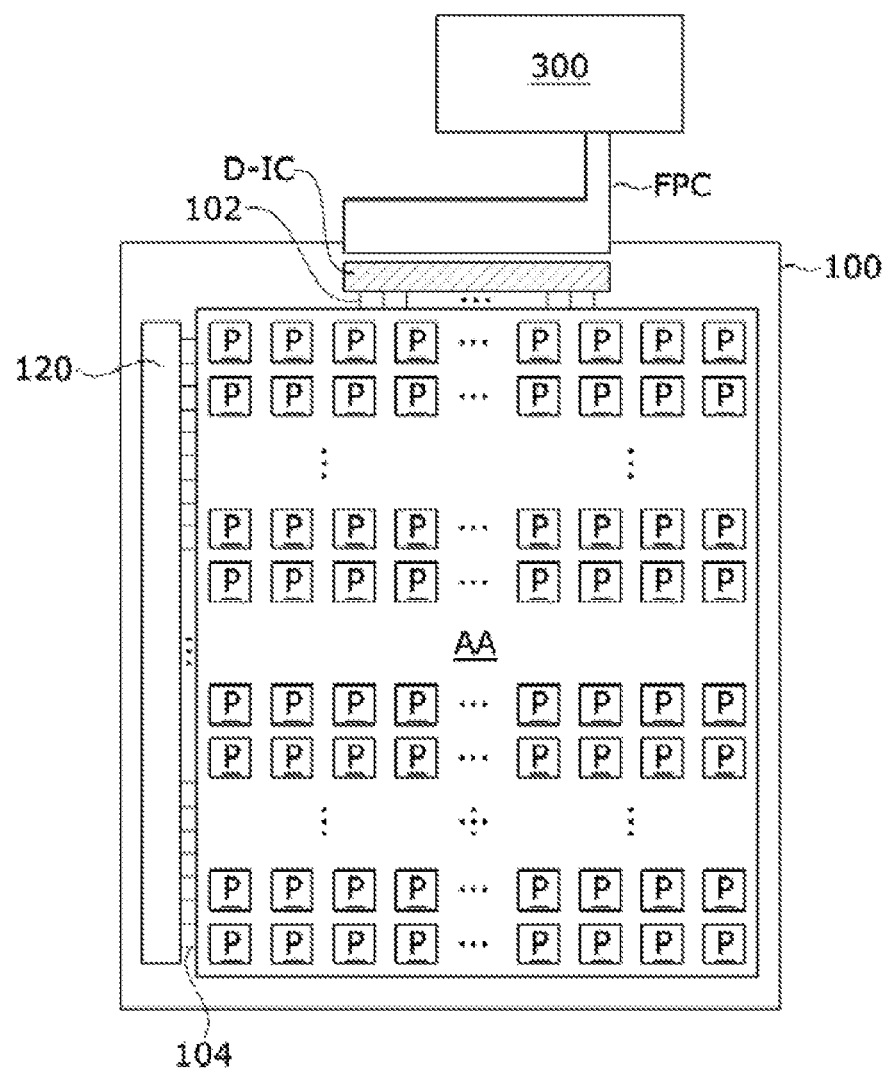

FIGS. 4A and 4B are diagrams illustrating the display driver and the display panel shown in FIG. 1 in detail.

Referring to FIG. 4A, the display device of the present disclosure includes a first display panel 100A, a second display panel 100B, and the display driver for driving the first and second display panels 100A and 100B.

The first and second display panels 100A and 100B may be implemented as display panels for displaying images in a flat panel display device such as a liquid crystal display (LCD) device or an electroluminescence display device. The electroluminescent display device may be classified into an inorganic light emitting display device and an organic light emitting display device according to the material of a light emitting layer. As an example of the inorganic light emitting display device, there is a quantum dot display device. Hereinafter, the display device will be mainly described as the organic light emitting display device, but is not limited thereto.

The first display panel 100A may be a display panel for the left eye, and the second display panel 100B may be a display panel for the right eye, but they are not limited thereto. In the case of a mobile terminal system such as a smartphone, a left-eye image and a right-eye image may be displayed together on the screen AA of one display panel 100 shown in FIG. 4B. In the case of a smartphone, a VR mode is supported as an example of a partial mode. In the VR mode of the smartphone, the left-eye image and the right-eye image may be displayed separately on one display panel. In the mobile terminal system according to the present disclosure, the left-eye image and the right-eye image may be displayed on one display panel in the VR mode, and the luminance of an image displayed in the non-focal region outside the high-resolution focal region may be controlled to be lower than that in the focal region in each of the left-eye image and the right-eye image.

Each of the display panels 100A and 100B includes data lines to which the pixel data of the input image is applied, gate lines (or scan lines) to which a gate signal is applied, and pixels arranged in a matrix form by a cross structure of the data lines and the gate lines. An image is displayed on pixel arrays disposed on the screens AA of the display panels 100A and 100B.

Each of the pixels may be divided into sub-pixels 101 such as a red sub-pixel, a green sub-pixel, and a blue sub-pixel to reproduce color. Each of the pixels may further include a white sub-pixel. In the case of the organic light emitting display device, each of the sub-pixels 101 may include a pixel circuit shown in FIG. 5, but is not limited thereto.

In a personal immersive system such as the VR/AR system, the left-eye image having lower luminance in the non-focal region than in the focal region may be displayed on the first display panel 100A. The right-eye image having lower luminance in the non-focal region than in the focal region may be displayed on the second display panel 100B.

In FIG. 4A, pixel lines L1, L2, . . . , Ln include one line of pixels to which pixel data is simultaneously written for one horizontal period on the screens of the display panels 100A and 100B. When the resolution of the screen AA is m*n, the screen AA includes n pixel lines L1, L2, . . . , Ln. In the display panel 100 of FIG. 4B, data is simultaneously written to pixels P of one of the pixel lines.

The display driver 200 writes the data of the input image to the display panels 100A and 100B. The display driver 200 includes data drivers 111 and 112, gate drivers 121 and 122, a timing controller 130, and the like.

A first data driver 111 and a first gate driver 121 are connected to the first display panel 100A to drive the first display panel 100A under the control of the timing controller 130. A second data driver 112 and a second gate driver 122 are connected to the second display panel 100B to drive the second display panel 100B under the control of the timing controller 130.

In the case of a mobile terminal system, as shown in FIG. 4B, the data driver and the timing controller may be built in a drive IC D-IC.

The data drivers 111 and 112 convert the pixel data from the timing controller 130 into a data voltage using a gamma compensation voltage, and output the data voltage to data lines 102. The data drivers 111 and 112 convert black grayscale data set separately from the pixel data of the input image into a black grayscale voltage using the gamma compensation voltage under the control of the timing controller 130, and may output the black grayscale voltage to the data lines 102. Accordingly, the pixel data voltage or the black grayscale voltage may be applied to each of the sub-pixels 101 through the data lines 102.

The gate drivers 121 and 122 output a gate signal (or scan signal) synchronized with the pixel data to gate lines 104. The gate drivers 121 and 122 include shift registers for sequentially supplying the gate signal to gate lines G1 to Gn by shifting the pulse of the gate signal.

The timing controller 130 transmits the pixel data of the input image received from the system controller 300 to the data drivers 111 and 112. The timing controller 130 may transmit the black grayscale data together with the pixel data to the data drivers 111 and 112. The timing controller 130 receives timing signals synchronized with the pixel data of the input image from the system controller 300, and controls the operation timings of the data drivers 111 and 112 and the gate drivers 121 and 122 based on the timing signals.

The timing controller 130 may count the pixel data of the input image as a clock to determine the positions of pixels into which the pixel data is written. The timing controller 130 transmits a control signal for controlling the pixel luminance of the focal region and the non-focal region to the data drivers 111 and 112, and if the pixel data of the input image is to be written into pixels belonging to the non-focal region, activates the control signal for lowering the pixel luminance to control the pixel luminance of the non-focal region to be lower than that of the focal region.

In FIG. 4B, the drive IC D-IC may be electrically connected to the system controller 300 through flexible printed circuits (FPC), and may be electrically connected to a gate driver 120 and the data lines 102 on the display panel 100. The drive IC D-IC includes the data driver and the timing controller. Accordingly, the drive IC D-IC converts the pixel data received from the system controller 300 into a data voltage to supply it to the data lines 102, and controls the operation timing of the gate driver 120. The drive IC D-IC generates a control signal for lowering the luminance of the pixels P in the non-focal region, so that the luminance of the pixels P in the non-focal region is lowered in response to the control signal.

In a mobile terminal system such as a smartphone, the left-eye image in which the luminance of the non-focal region is lower than that of the focal region, and the right-eye image in which the luminance of the non-focal region is lower than that of the focal region may be displayed on one display panel 100.

Each of the sub-pixels 101 includes a pixel circuit for driving a light emitting element OLED. The pixel circuit is not limited to that shown in FIG. 5.

Figure 5:
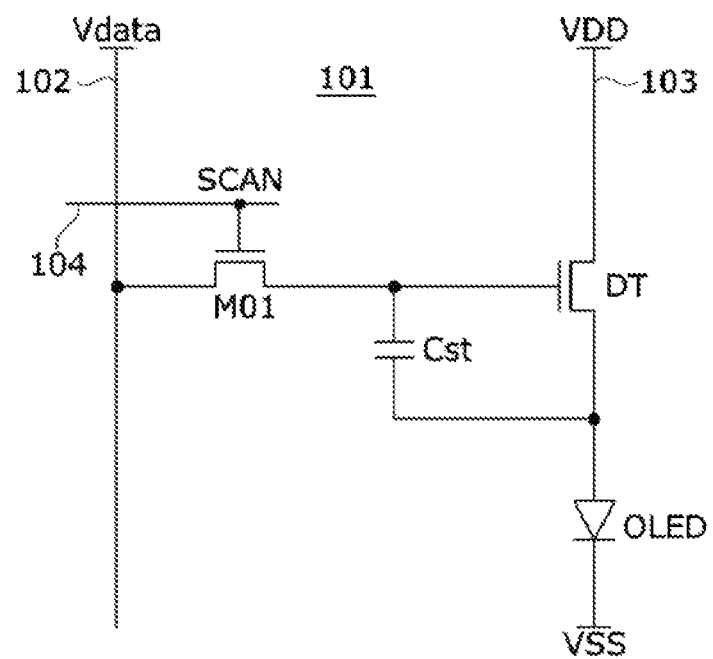
FIG. 5 is a circuit diagram illustrating an example of a pixel circuit.

Referring to FIG. 5, the pixel circuit includes the light emitting element OLED, a driving element DT for supplying a current to the light emitting element OLED, a switch element M01 that connects the data line 102 to the driving element DT in response to a scan pulse SCAN, and a capacitor Cst connected to the gate of the driving element DT. Each of the driving element DT and the switch element M01 may be implemented with a transistor.

A pixel driving voltage VDD is applied to a first electrode of the driving element DT through a power line 103. The switch element M01 is turned on in response to the gate-on voltage of the gate signal SCAN to supply a data voltage Vdata to the gate electrode of the driving element DT and the capacitor Cst. The driving element DT supplies a current to the light emitting element OLED according to a gate-source voltage Vgs to drive the light emitting element OLED.

The anode electrode of the light emitting element OLED is connected to a second electrode of the driving element DT, and the cathode electrode thereof is connected to a low potential voltage source VSS. When a forward voltage between the anode electrode and the cathode electrode is equal to or greater than a threshold voltage, the light emitting element OLED is turned on to emit light. The capacitor Cst is connected between the gate electrode and the source electrode of the driving element DT to maintain the gate-source voltage Vgs of the driving element DT.

Figure 7:
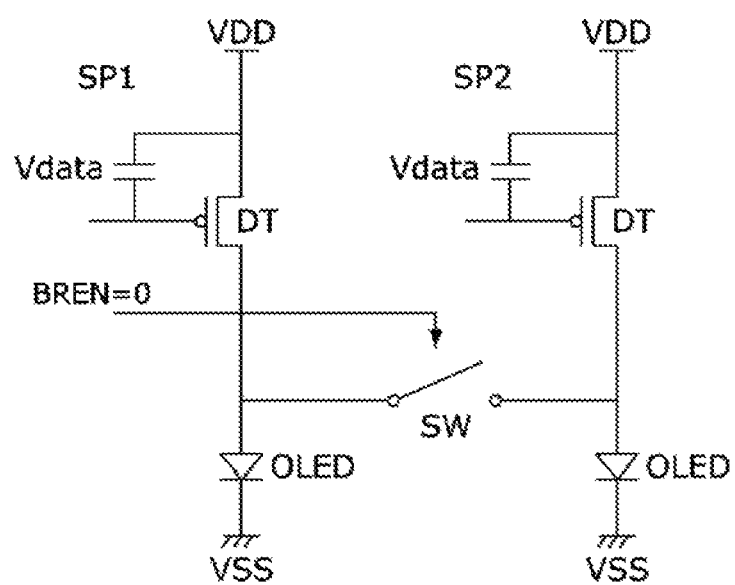
FIG. 7 is an equivalent circuit diagram schematically illustrating operations of adjacent sub-pixels in a focal region.
Figure 9:
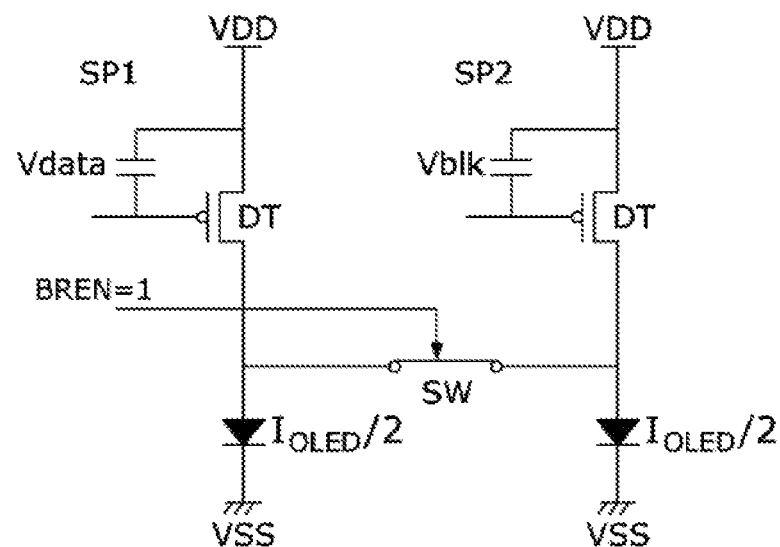
FIG. 9 is an equivalent circuit diagram schematically illustrating operations of adjacent sub-pixels in a non-focal region.

As shown in FIGS. 7 and 9, adjacent sub-pixels may be connected through a switch element SW in at least a part of the screen AA. When pixel data is written to a sub-pixel of the focal region and black grayscale data is written to a sub-pixel adjacent thereto, if the sub-pixels are short-circuited through the switch element SW, a current $I_{OLED}$ of the light emitting element OLED is discharged through the adjacent sub-pixels, thereby lowering the luminance of the pixel data. The switch element SW may be implemented with a transistor.

Figure 8:
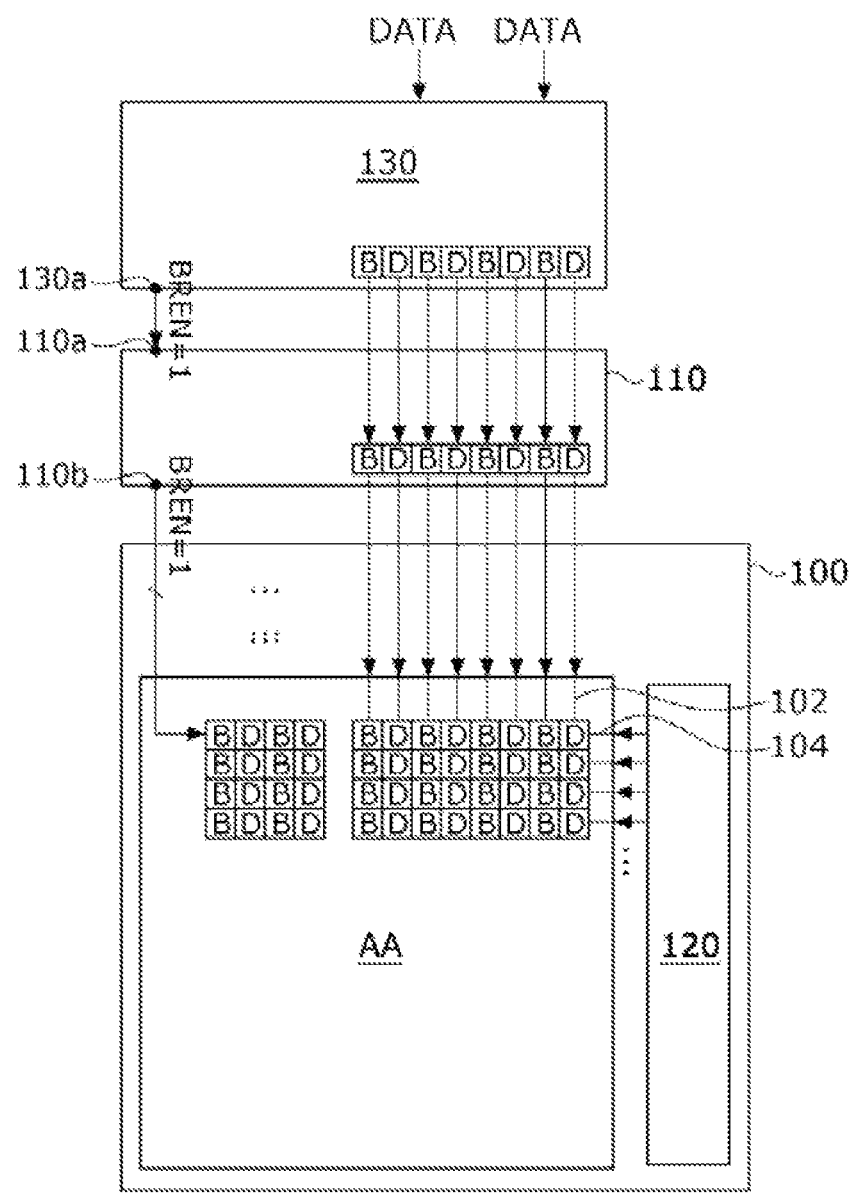
FIG. 8 is a diagram illustrating an operation of a display driver in a non-focal region.

The display driver 200 may write pixel data to any one of n (n being a positive integer greater than or equal to 2) sub-pixels adjacent to each other within the non-focal region, and may write black grayscale data that is preset to the other sub-pixels. In particular, as shown in FIGS. 8 and 9, when pixel data to be written into the sub-pixels of the non-focal region is received, the timing controller 130 may apply a control signal BREN of an activation logic value for controlling on/off of the switch element SW to a control electrode (or gate electrode) of the switch element SW to turn on the switch element SW, thereby controlling the luminance of the non-focal region to be lower than that of the focal region.

Figure 6:
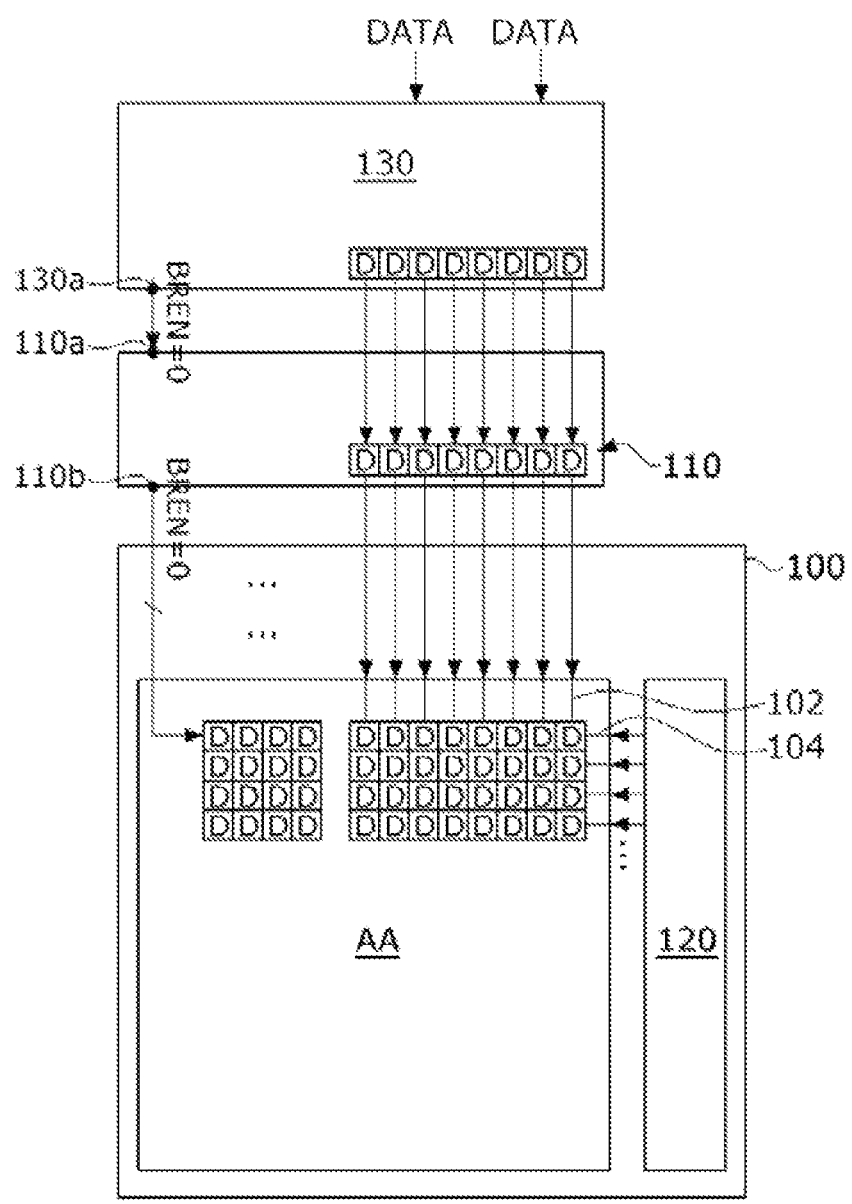
FIG. 6 is a diagram illustrating an operation of a display driver in a focal region.

FIG. 6 is a diagram illustrating an operation of a display driver in a focal region. FIG. 7 is an equivalent circuit diagram schematically illustrating operations of adjacent sub-pixels in a focal region.

Referring to FIGS. 6 and 7, the timing controller 130 receives pixel data DATA of an input image from the system controller 300 through an interface receiving circuit. As described above, the pixel data DATA of the non-focal region has a lower resolution than the pixel data DATA of the focal region.

The interface receiving circuit may encode N (N being a positive integer greater than or equal to 2) pixel data into one data packet and transmit it to the timing controller 130. A decoder in the timing controller 130 may decode each data packet received and sequentially transmit N pixel data to a data driver 110.

The timing controller 130 includes a control signal output terminal 130a. The data driver 110 includes a control signal input terminal 110a and an output terminal 110b. The data driver 110 converts pixel data D received from the timing controller 130 into the data voltage Vdata and supplies it to the data lines 102.

Adjacent sub-pixels SP1 and SP2 are connected to each other through the switch element SW in at least a part of the screen AA. The switch element SW may be connected between the anode electrodes of the light emitting elements OLED formed in the adjacent sub-pixels SP1 and SP2, but is not limited thereto.

When the pixel data of the focal region is received, the timing controller 130 outputs the control signal BREN as an inactivation logic value, e.g., a logic value of 0 (or low). As a result, the switch element SW connected between the adjacent sub-pixels SP1 and SP2 in the focal region is turned off, so that the sub-pixels SP1 and SP2 are electrically separated from each other. In this case, the data voltage Vdata of the pixel data is independently charged in each of the sub-pixels SP1 and SP2. Accordingly, the current $I_{OLED}$ flows through the light emitting element OLED in each of the sub-pixels SP1 and SP2 of the focal region, and the light emitting element OLED emits light with a brightness corresponding to the grayscale of the pixel data.

FIG. 8 is a diagram illustrating an operation of a display driver in a non-focal region. FIG. 9 is an equivalent circuit diagram schematically illustrating operations of adjacent sub-pixels in a non-focal region.

Referring to FIGS. 8 and 9, when the pixel data DATA of the non-focal region is received, the timing controller 130 may transmit black grayscale data B stored in the memory together with the pixel data D to the data driver 110. While the data of the non-focal region is received, the data driver 110 supplies the data voltage Vdata of the pixel data to the odd-numbered data lines 102 and supplies a black grayscale voltage Vblk to the even-numbered data lines 102. Accordingly, the data voltage Vdata of the pixel data is applied to one of the adjacent sub-pixels SP1 and SP2 in the non-focal region, while the black grayscale voltage Vblk is applied to the other one. In the case of the sub-pixel to which the black grayscale voltage Vblk is applied, the driving element DT of the sub-pixel is not turned on, but a current may flow through the light emitting element OLED due to a current applied from its adjacent sub-pixel through the switch element SW, so that the light emitting element OLED may emit light with low brightness. If the black grayscale voltage Vblk is applied to all of the sub-pixels connected through the switch element SW, a current does not flow through the light emitting element OLED in the sub-pixels, so that the sub-pixels do not emit light.

When the pixel data of the non-focal region is received, the timing controller 130 outputs the control signal BREN as an activation logic value, e.g., a logic value of 1 (or high). As a result, the switch element SW connected between the adjacent sub-pixels SP1 and SP2 in the non-focal region is turned on. When the switch element SW is turned on, the anode electrodes of the light emitting elements OLED formed in the adjacent sub-pixels SP1 and SP2 are short-circuited.

When the sub-pixels SP1 and SP2 are short-circuited through the switch element SW, the data voltage Vdata of the pixel data is charged in the first sub-pixel SP1, while the black grayscale voltage Vblk is applied to the second sub-pixel SP2. As a result, the current $I_{OLED}$ flowing through the light emitting element OLED of the first sub-pixel SP1 flows through two light emitting elements OLED formed in the adjacent sub-pixels SP1 and SP2.

If it is assumed that the light emitting elements OLED formed in the adjacent sub-pixels SP1 and SP2 have the same electrical characteristics when the switch element SW is turned on, since the impedance of the two light emitting elements OLED is the same, the current $I_{OLED}$ flows through both the light emitting elements OLED by half. As a result, the amount of current flowing through the light emitting elements OLED in the adjacent sub-pixels SP1 and SP2 connected through the switch element SW is reduced to about ½ ($I_{OLED}/2$) level.

When the adjacent sub-pixels SP1 and SP2 in the non-focal region are short-circuited through the switch element SW, even if pixel data of a peak white grayscale (or the highest grayscale) is applied to the sub-pixels of the focal region and the non-focal region, the luminance of the sub-pixels located in the non-focal region becomes lower than the luminance of the sub-pixels located in the focal region. Accordingly, in the present disclosure, power consumption may be significantly reduced by lowering the luminance in the non-focal region where the user does not perceive the image quality degradation.

Figure 13:
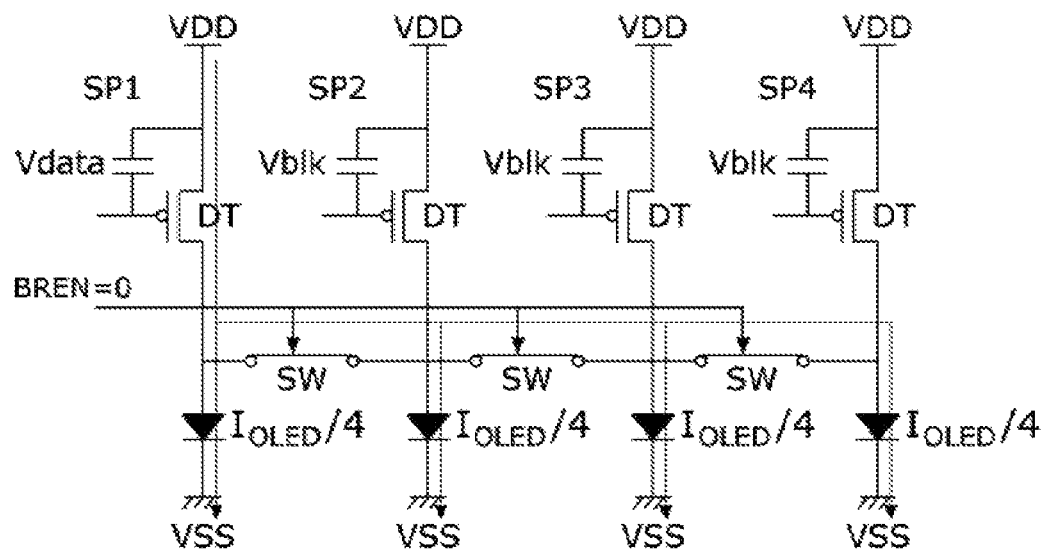
Figure 14:
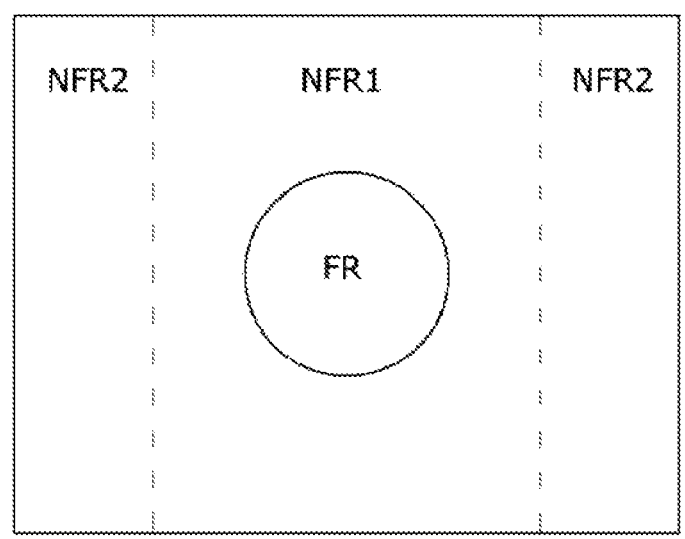
FIG. 14 is a diagram illustrating an example in which the luminance of a non-focal region is gradually lowered as the distance from a focal region increases.

The switch element for lowering the luminance of the sub-pixels in the non-focal region may connect a plurality of adjacent sub-pixels to each other as shown in FIGS. 10 to 13. By using these sub-pixels, the luminance of the pixels in the non-focal region may be gradually lowered as the distance from the focal region increases. For example, as shown in FIG. 14, the non-focal region NFR may be divided into a first non-focal region NFR1 that is close to the focal region FR and a second non-focal region NFR2 that is relatively far from the focal region FR. The first non-focal region NFR1 is a pixel area between the focal region FR and the second non-focal region NFR2.

The first non-focal region NFR1 may include the sub-pixels SP1 and SP2 shown in FIGS. 7 and 9. The second non-focal region NFR2 may include sub-pixels SP1 to SP4 shown in FIGS. 10 to 13.

Figure 10:
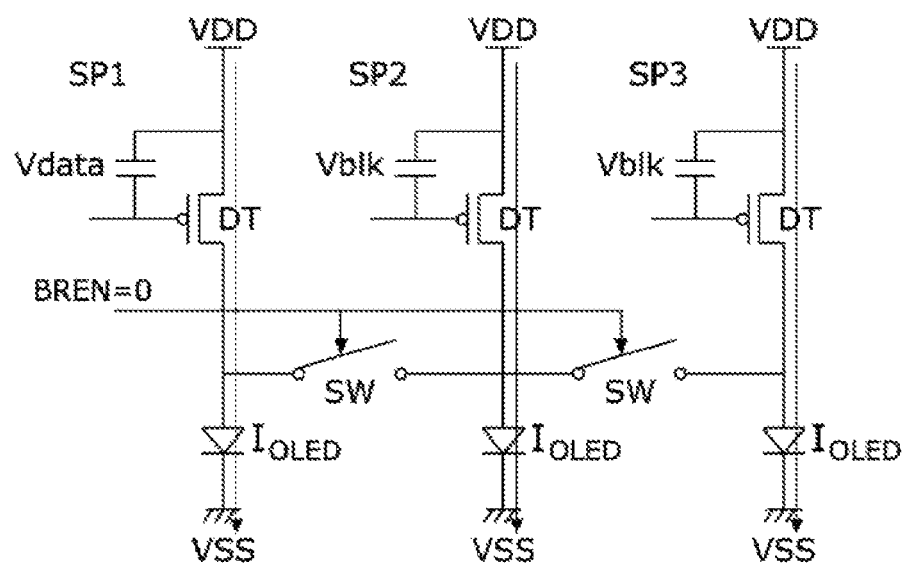
FIGS. 10 and 11 are circuit diagrams illustrating a switch element connected to three adjacent sub-pixels.
Figure 11:
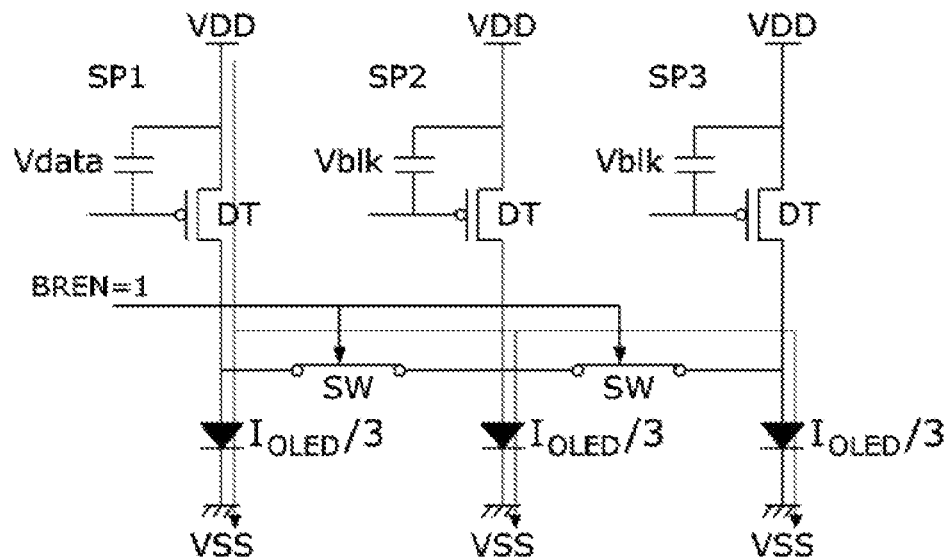
Figure 12:
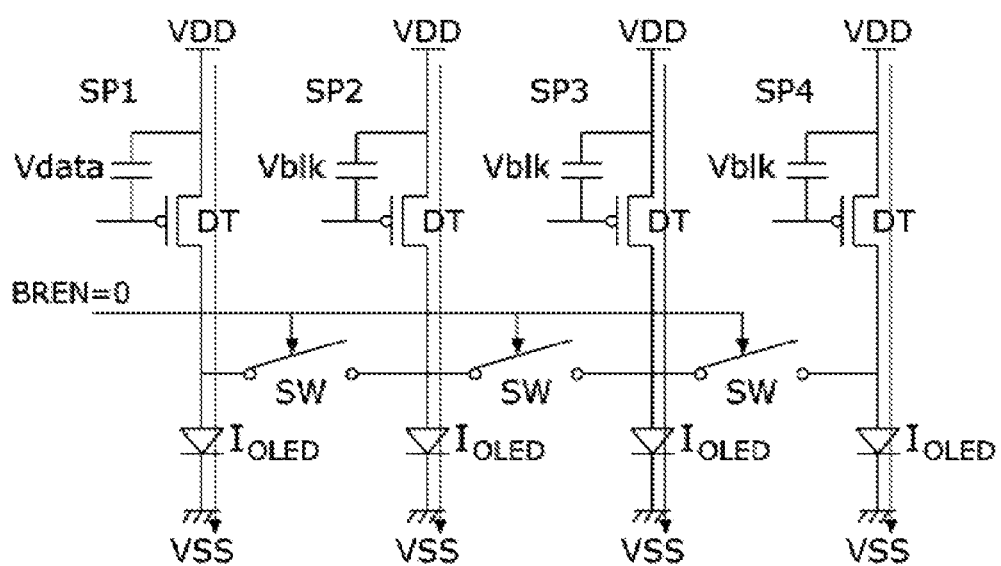
FIGS. 12 and 13 are circuit diagrams illustrating switch elements connected to four adjacent sub-pixels.

In an aspect shown in FIGS. 10 and 11, three sub-pixels are connected to each other through switch elements SW, and as shown in FIG. 11, when the switch elements SW are turned on, the amount of current flowing through the light emitting elements OLED of the sub-pixels may be reduced to about ⅓ ($I_{OLED}/3$). In an aspect shown in FIGS. 12 and 13, four sub-pixels are connected to each other through switch elements SW, and as shown in FIG. 13, when the switch elements SW are turned on, the amount of current flowing through the light emitting elements OLED of the sub-pixels may be reduced to about ¼ ($I_{OLED}/4$). Accordingly, as the number of sub-pixels connected through the switch elements SW increases, the luminance of the non-focal region NFR1 and NFR2 may be controlled to be lower.

When the pixel data of the same grayscale is applied to all pixels of the screen AA, the luminance of the first non-focal region NFR1 may be controlled to be lower than the luminance of the focal region FR using the pixel circuits shown in FIGS. 7 and 9, and the luminance of the second non-focal region NFR2 may be controlled to be lower than the luminance of the first non-focus region NFR1 using the pixel circuits shown in FIGS. 10 to 13.

The control signal BREN may be generated with the number of bits corresponding the number of pixel groups divided in one pixel line. For example, when one pixel line is divided into ten pixel groups, the timing controller 130 may output a 10-bit control signal BREN [9:0] for one horizontal period.

Figure 15:
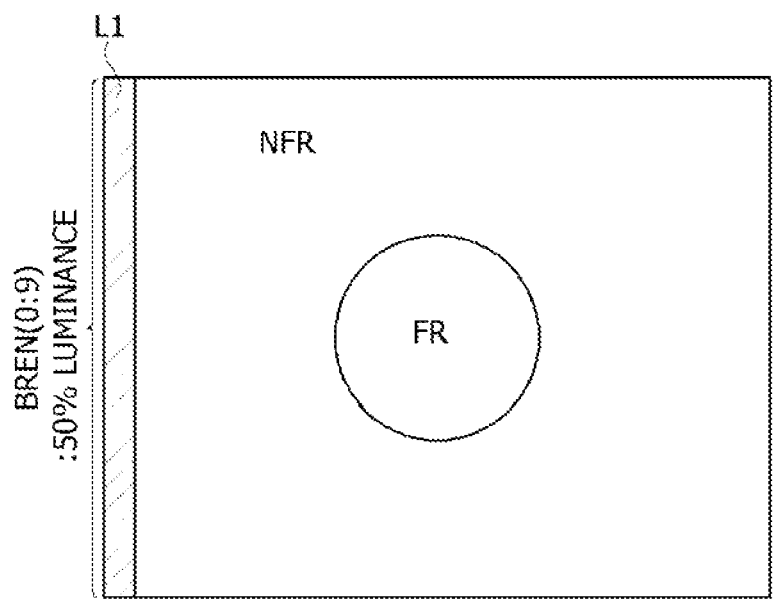
FIG. 15 is a diagram illustrating one pixel line in a non-focal region.
Figure 16:
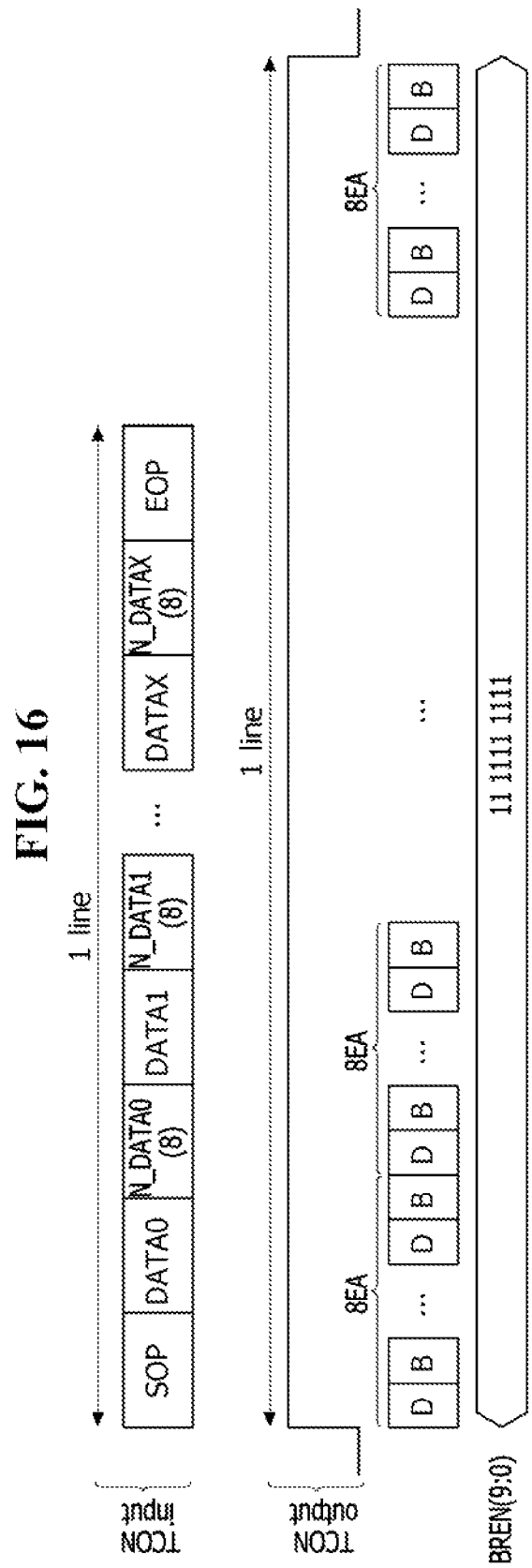
FIG. 16 is a diagram illustrating an input/output signal of a timing controller for transmitting data to be written in pixels of one pixel line shown in FIG. 15.

FIG. 15 is a diagram illustrating one pixel line in a non-focal region. FIG. 16 is a diagram illustrating an input/output signal of a timing controller for transmitting data to be written into pixels of one pixel line shown in FIG. 15. In FIG. 16, "TCON" denotes the timing controller 130, "D" is pixel data, and "B" is black grayscale data. "SOP" is a start code assigned to the beginning of the pixel data of one pixel line inputted to the timing controller 130, and "EOP" is an end code assigned to the end of the pixel data of one pixel line. It is assumed that a first pixel line L1 includes only sub-pixels of the non-focal region NFR. In this case, the timing controller 130 may receive the pixel data of the input image, add black grayscale data to between the pixel data to be applied to the first pixel line L1 during the first horizontal period, and transmits it to the data driver 110. For example, the timing controller 130 may transmit data decoded into a pair of data including the pixel data D and the black grayscale data B to the data driver 110.

Figure 17:
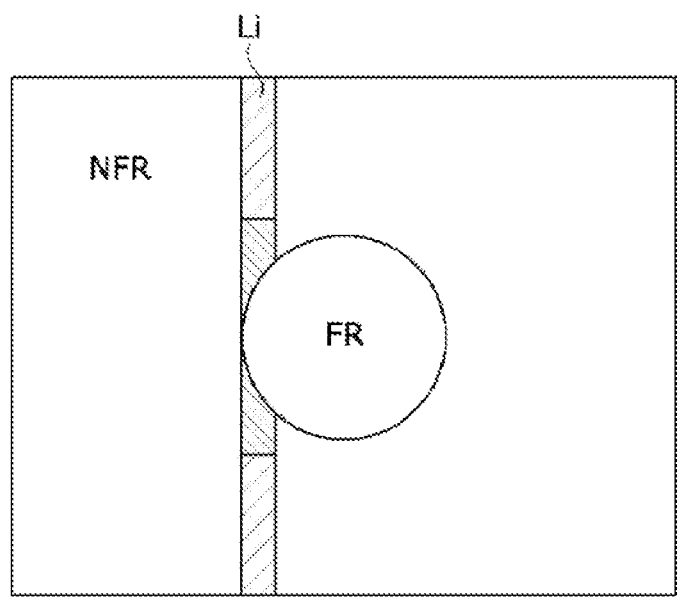
FIG. 17 is a diagram illustrating a one pixel line traversing a focal region and a non-focal region.
Figure 18:
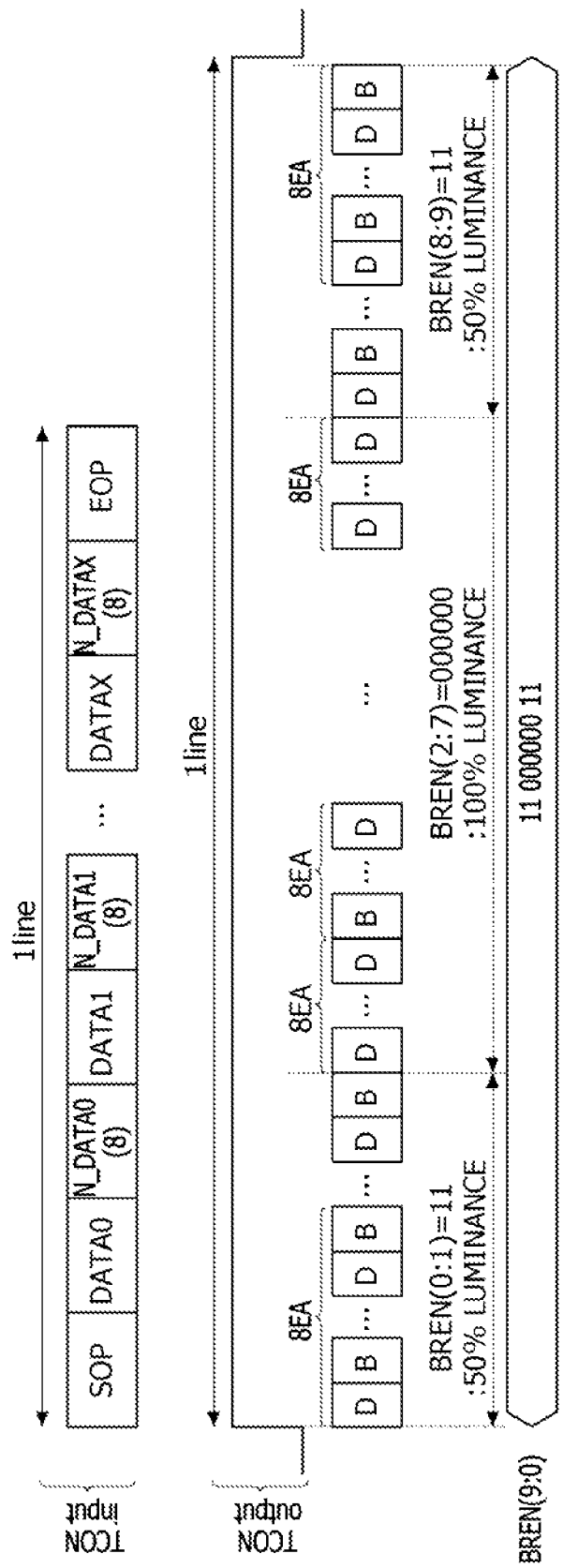
FIG. 18 is a diagram illustrating an input/output signal to/from a timing controller for transmitting data to be written in pixels of one pixel line shown in FIG. 17.

FIG. 17 is a diagram illustrating one pixel line traversing a focal region and a non-focal region. FIG. 18 is a diagram illustrating an input/output signal to/from a timing controller for transmitting data to be written into pixels of one pixel line shown in FIG. 17.

An $i^{th}$ (i being a positive integer) pixel line Li shown in FIG. 17 may exist in the focal region where the user's gaze is directed. When the user's gaze moves, the focal region also moves. The timing controller 130 may receive the pixel data of the input image and rearrange, among the pixel data to be applied to the $i^{th}$ pixel line Li during an $i^{th}$ horizontal period, data to be written to the sub-pixels of the non-focal region NFR into a pair of data decoded into the pixel data D and the black grayscale data B. Then, the timing controller 130 may transmit it to the data driver 110 in synchronization with the activation logic value of the control signal BREN. In addition, the timing controller 130 may transmit, among the pixel data to be applied to the $i^{th}$ pixel line Li, the pixel data D of the sub-pixels of the focal region FR to the data driver 110 in synchronization with the inactivation logic value of the control signal BREN.

In FIGS. 16 and 18, the timing controller 130 receives pixel data DATA0 to DATAX and transmits a total of X pixel data to be written into the sub-pixels of one pixel line to the data driver 110 using a decoder. In N_DATA0 to N-DATAX, "8" is the number of repetitions of the same pixel data. When the decoder receives one pixel data, e.g., DATA0, it transmits the pixel data by the number defined in the number of repetitions. "SOP (Start of Packet)" is a start code of a data packet including pixel data of one pixel line, and "EOP (End of Packet)" is an end code of the data packet.

Figure 19:
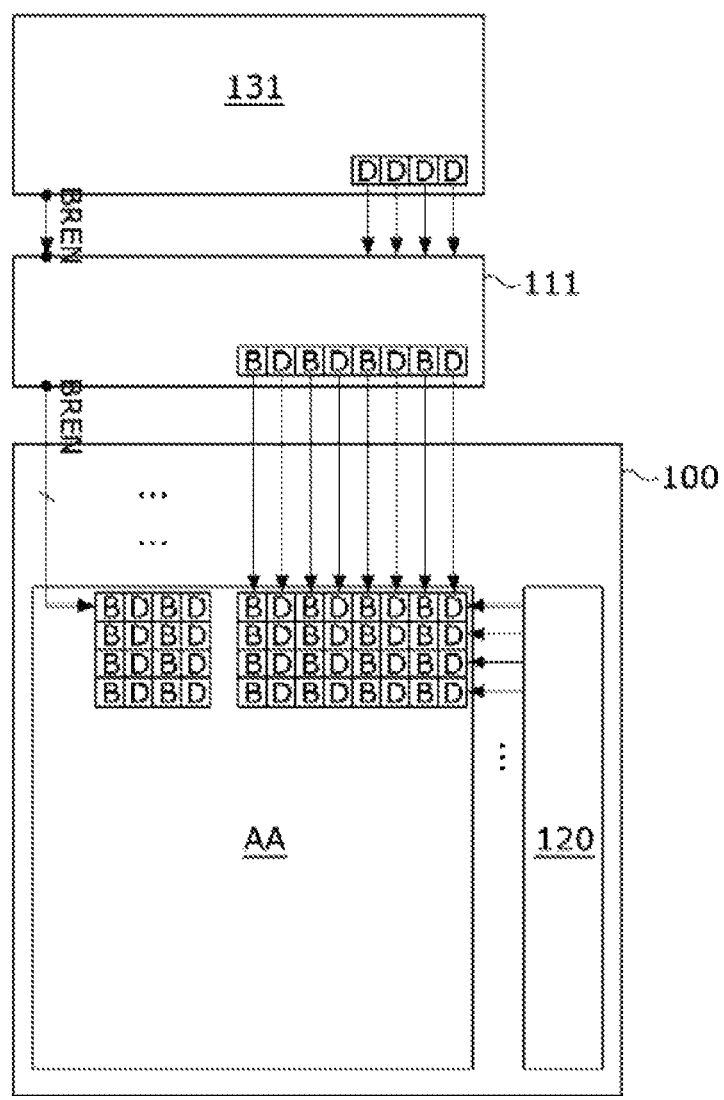
FIG. 19 is a diagram illustrating a display driver according to another aspect of the present disclosure.

FIG. 19 is a diagram illustrating a display driver according to another aspect of the present disclosure.

Referring to FIG. 19, the timing controller 131 receives the pixel data of the input image from the system controller 300 through the interface receiving circuit. As described above, the pixel data DATA of the non-focal region NFR has a lower resolution than the pixel data DATA of the focal region FR.

The adjacent sub-pixels SP1 and SP2 are connected through the switch element SW in at least a part of the screen AA. The switch element SW is connected between the anode electrodes of the light emitting elements OLED formed in the adjacent sub-pixels SP1 and SP2.

When the pixel data D of the focal region FR is received, the timing controller 131 outputs the control signal BREN as the inactivation logic value. When the pixel data D of the non-focal region NFR is received, the timing controller 131 outputs the control signal BREN as the activation logic value.

The data driver 111 receives the pixel data D and the control signal BREN from the timing controller 130. The data driver 111 converts the black grayscale data B into a black grayscale voltage in response to the activation logic value of the control signal BREN. The data driver 111 does not output the black grayscale voltage when the control signal BREN is the inactivation logic value. In this aspect, the timing controller 131 may not output the black grayscale data, and the black grayscale voltage may be generated in the data driver 111.

In the focal region FR, the switch elements SW connected between the adjacent sub-pixels SP1 and SP2 are turned off to electrically separate the sub-pixels SP1 and SP2 from each other. In this case, the current $I_{OLED}$ flows through the light emitting element OLED in each of the sub-pixels SP1 and SP2 of the focal region FR, so that the light emitting element OLED emits light with a brightness corresponding to the grayscale of the pixel data.

In the non-focal region NFR, the switch elements SW connected between the adjacent sub-pixels SP1 and SP2 are turned on to distribute the current $I_{OLED}$ to the light emitting elements OLED formed in the sub-pixels SP1 and SP2, so that the luminance of the sub-pixels SP1 to SP4 is lowered.

Figure 20:
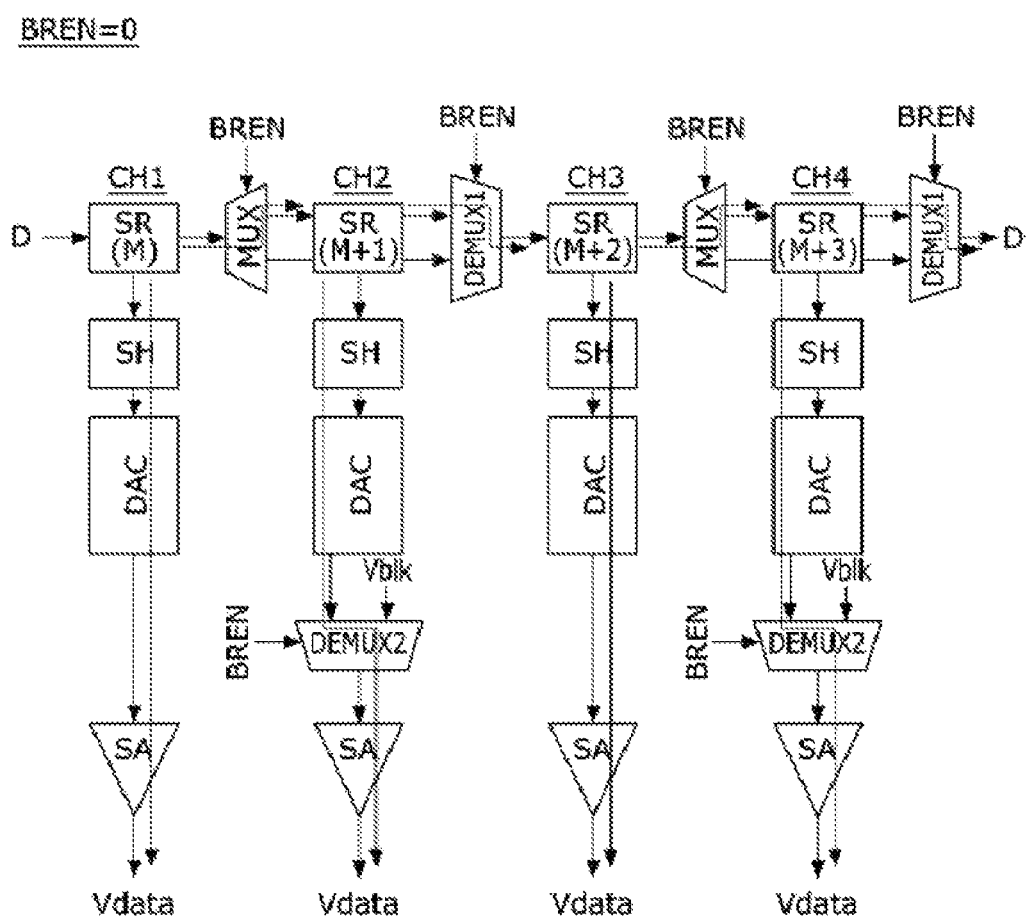
FIG. 20 is a circuit diagram illustrating an operation of a data driver shown in FIG. 19 in a focal region.

FIG. 20 is a circuit diagram illustrating an operation of the data driver 111 shown in FIG. 19 in a focal region.

Referring to FIG. 20, the data driver 111 includes a plurality of pixel data channels CH1 and CH3 and a plurality of switchable channels CH2 and CH4.

Each of the pixel data channels CH1 and CH3 converts the pixel data D to be written to the pixels of the focal region FR and the non-focal region NFR into the data voltage Vdata and outputs it. When the pixel data D of the focal region FR is received, each of the switchable channels CH2 and CH4 converts the pixel data D into the data voltage Vdata to output it, and when the pixel data D of the non-focal region NFR is received, outputs the black grayscale voltage Vblk.

Each of the channels CH1 to CH4 includes a sample & holder connected to a signal transmission unit SR of a shift register, a digital to analog converter (hereinafter referred to as "DAC"), and an output buffer SA.

The shift register includes signal transmission units SR for sequentially shifting input data. A multiplexer MUX and a first demultiplexer DEMUX1 are alternately connected between the signal transmission units SR. Multiplexers MUX and first demultiplexers DEMUX1 are alternately connected between the signal transmission units SR. For example, the multiplexer MUX may be connected between an $M^{th}$ (M being a positive integer) signal transmission unit SR(M) and an $(M+1)^{th}$ signal transmission unit SR(M+1). The first demultiplexer DEMUX1 may be connected between the $(M+1)^{th}$ signal transmission unit SR(M+1) and an $(M+2)^{th}$ signal transmission unit SR(M+2). When the multiplexer MUX is connected to the input terminal of the signal transmission unit SR, the first demultiplexer DEMUX1 is connected to the output terminal of the signal transmission unit SR. In addition, the first demultiplexer DEMUX1 is connected to the input terminal of a next signal transmission unit SR, and the multiplexer MUX is connected to the output terminal thereof.

Each of the switchable channels CH2 and CH4 further includes a second demultiplexer DEMUX2 connected between the DAC and the output buffer SA.

The timing controller 131 outputs the control signal BREN as the inactivation logic value when the pixel data D to be written into the sub-pixels of the focal region FR is received. In this case, in response to the inactivation logic value of the control signal BREN, the multiplexers MUX and the first demultiplexers DEMUX1 connect adjacent signal transmission units SR to each other to allow the pixel data D to be sequentially transmitted to a next signal transmission unit SR. The multiplexer MUX may transmit the pixel data from the $M^{th}$ signal transmission unit SR(M) to the $(M+1)^{th}$ signal transmission unit SR(M+1) in response to the inactivation logic value of the control signal BREN, and may transmit the pixel data from the $M^{th}$ signal transmission unit SR(M) to the first demultiplexer DEMUX1 in response to the activation logic value of the control signal BREN. The first demultiplexer DEMUX1 may transmit the pixel data from the $(M+1)^{th}$ signal transmission unit SR(M+1) to the $(M+2)^{th}$ signal transmission unit SR(M+2) in response to the inactivation logic value of the control signal BREN, and may transmit the pixel data from the $M^{th}$ signal transmission unit SR(M) to the $(M+2)^{th}$ signal transmission unit SR(M+2) in response to the activation logic value of the control signal BREN.

In the channels CH1 to CH4, the sample & holders SH sample data received from the signal transmission units SR of the shift register and output the sampled data simultaneously in synchronization with a clock.

The DAC of each of the pixel data channels CH1 and CH3 converts the pixel data from the sample & holder SH into the data voltage Vdata and output it. The data voltage Vdata outputted from the DAC of each of the pixel data channels CH1 and CH3 is applied to the data line 102 through the output buffer SA.

The DAC of each of the switchable channels CH2 and CH4 converts the pixel data from the sample & holder SH into the data voltage Vdata and output it.

A first input terminal of the second demultiplexer DEMUX2 is connected to an output terminal of the DAC of the switchable channel CH2, CH4, and the black grayscale voltage Vblk is applied to a second input terminal of the second demultiplexer DEMUX2. An output terminal of the second demultiplexer DEMUX2 is connected to an input terminal of the output buffer SA disposed in the switchable channel CH2, CH4. The black grayscale voltage Vblk may be generated within the data driver 111 or may be externally generated and applied to the second demultiplexer DEMUX2.

The second demultiplexer DEMUX2 applies the data voltage Vdata from the DAC to the output buffer SA in response to the inactivation logic value of the control signal BREN. The second demultiplexer DEMUX2 applies the black grayscale voltage Vblk to the output buffer SA in response to the activation logic value of the control signal BREN. As a result, in the focal region FR, the data voltage Vdata from the DAC of the switchable channel CH2, CH4 is applied to the data line 102 through the second demultiplexer DEMUX2 and the output buffer SA.

When the data driver 111 receives the pixel data of the focal region, it outputs the data voltage Vdata of the pixel data in all the channels CH1 to CH4.

Figure 21:
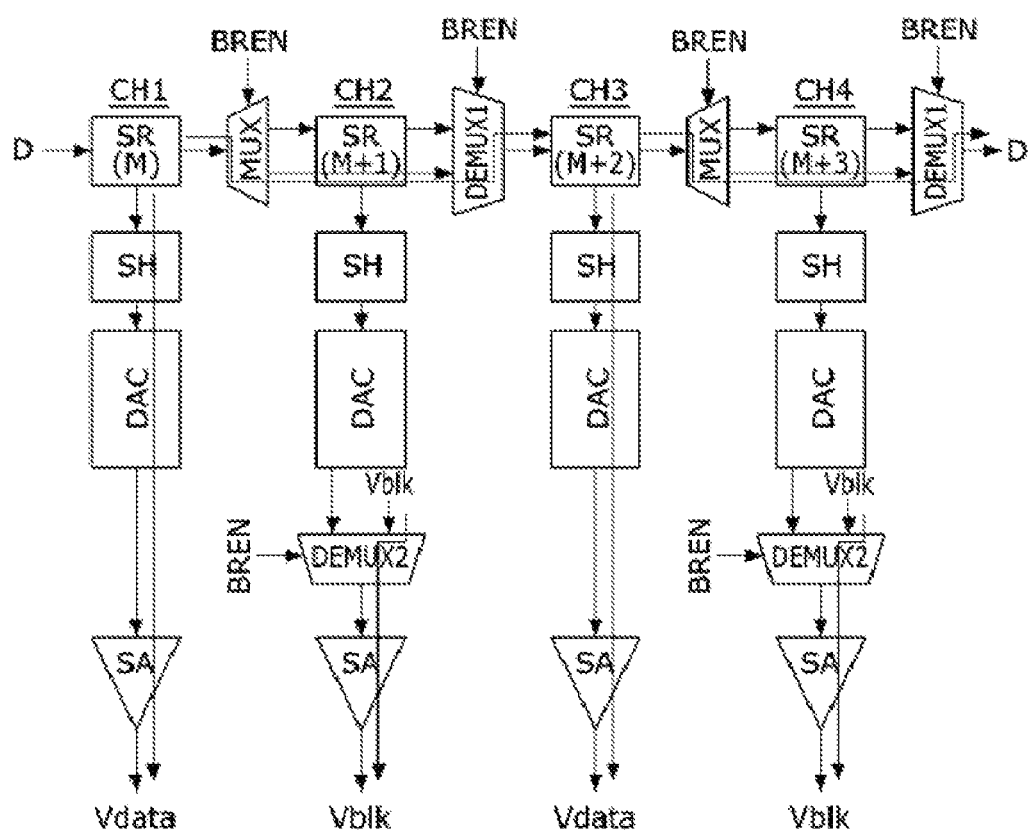
FIG. 21 is a circuit diagram illustrating an operation of a data driver shown in FIG. 19 in a non-focal region.

FIG. 21 is a circuit diagram illustrating an operation of the data driver in a non-focal region, shown in FIGS. 15 and 16.

Referring to FIG. 21, the timing controller 131 outputs the control signal BREN as the activation logic value when the pixel data D to be written into the sub-pixels of the non-focal region NFR is received. In this case, in response to the activation logic value of the control signal BREN, the multiplexers MUX and the first demultiplexers DEMUX1 connect the signal transmission units SR of the pixel data channels CH1 and CH3 to each other through a bypass lines passing through the signal transmission units of the switchable channels CH2 and CH4. Accordingly, when the pixel data of the non-focal region NFR is received by the data driver 111, the pixel data D is sequentially transmitted only through the signal transmission units of the pixel data channels CH1 and CH3 in the shift register. In this case, the pixel data D is not transmitted to the signal transmission unit SR, the sample & holder SH, and the DAC in the switchable channels CH2 and CH4.

In the pixel data channels CH1 and CH3, the sample & holders SH sample data received from the signal transmission unit SR of the shift register and output the sampled data simultaneously in synchronization with a clock.

The DAC of each of the pixel data channels CH1 and CH3 converts the pixel data from the sample & holder SH into the data voltage Vdata and output it. The data voltage Vdata outputted from the DAC of each of the pixel data channels CH1 and CH3 is applied to the data line 102 through the output buffer SA.

In the DAC of each of the switchable channels CH2 and CH4, the second demultiplexer DEMUX2 connects the black grayscale voltage Vblk to the input terminal of the output buffer SA in response to the activation logic value of the control signal BREN. Accordingly, the black grayscale voltage Vblk is applied to the data line 102 through the second demultiplexer DEMUX2 and the output buffer SA of each of the switchable channels CH2 and CH4 in the non-focal region.

The objects to be achieved by the present disclosure, the means for achieving the objects, and effects of the present disclosure described above do not specify essential features of the claims, and thus, the scope of the claims is not limited to the disclosure of the present disclosure.

Although the aspects of the present disclosure have been described in more detail with reference to the accompanying drawings, the present disclosure is not limited thereto and may be embodied in many different forms without departing from the technical concept of the present disclosure. Therefore, the aspects disclosed in the present disclosure are provided for illustrative purposes only and are not intended to limit the technical concept of the present disclosure. The scope of the technical concept of the present disclosure is not limited thereto. Therefore, it should be understood that the above-described aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising
    a display panel in which a plurality of data lines, a plurality of gate lines, and a plurality of sub-pixels electrically connected to the plurality of data lines and the plurality of gate lines are arranged; and
    a display driver configured to drive the display panel by writing pixel data to the sub-pixels,
    wherein at least a part of the display panel includes a switch element configured to electrically connect adjacent sub-pixels to each other in response to a first logic value of a control signal, and electrically separate the adjacent sub-pixels from each other in response to a second logic value of the control signal, wherein the display driver is configured to apply the second logic value of the control signal to the switch element when receiving pixel data to be written to a focal region on the display panel to which a user's gaze is directed, and applies the first logic value of the control signal to the switch element when receiving pixel data to be written to a non-focal region other than the focal region on the display panel.

2. The display device of claim 1, wherein the pixel data to be written to sub-pixels of the focal region includes data having a higher resolution than that of the pixel data to be written to sub-pixels of the non-focal region.

3. The display device of claim 2, wherein the display driver is configured to write pixel data to one of n (n being a positive integer greater than or equal to 2) sub-pixels adjacent in the non-focal region, and writes preset black grayscale data to the other sub-pixels.

4. The display device of claim 1, wherein when pixel data of a same grayscale is written to sub-pixels of the focal region and the non-focal region, luminance of the non-focal region is lower than luminance of the focal region.

5. The display device of claim 1, wherein the non-focal region is divided into two or more pixel areas having luminance gradually lowered as a distance from the focal region increases.

6. The display device of claim 1, wherein the display driver includes:
a timing controller configured to receive the pixel data of the focal region and the pixel data of the non-focal region, and when receiving the pixel data of the non-focal region, generate the control signal as the first logical value, and when receiving the pixel data of the focal region, generate the control signal as the second logical value; and
a data driver configured to convert the pixel data from the timing controller into a data voltage to supply it to the data lines, and supply a black grayscale voltage to the data lines.

7. The display device of claim 6, wherein the timing controller includes an output terminal through which the control signal is outputted, and the data driver includes an input terminal through which the control signal is inputted.

8. The display device of claim 6, wherein, when receiving the pixel data of the non-focal region, the timing controller adds black grayscale data to between pixel data and transmits it to the data driver.

9. The display device of claim 8, wherein the data driver is configured to convert the black grayscale data into the black grayscale voltage and supplies it to the data lines of the non-focal region.

10. The display device of claim 6, wherein the data driver includes:
a plurality of pixel data channels configured to convert pixel data to be written to sub-pixels of the focal region and the non-focal region into the data voltage and output it; and
a plurality of switchable channels configured, when receiving the pixel data of the focal region, to convert the pixel data into the data voltage and output it, and when receiving the pixel data of the non-focal region, to output the black grayscale voltage.

11. The display device of claim 10, wherein the data driver further includes a shift register including a plurality of signal transmission units configured to sequentially shift the pixel data received from the timing controller, and
wherein each of the pixel data channels and the switchable channels includes:
a sample & holder connected to a signal transmission unit of the shift register;
a digital-to-analog converter configured to convert the pixel data from the sample & holder into the data voltage; and
an output buffer configured to output the data voltage from the digital-to-analog converter to the data line.

12. The display device of claim 11, wherein the data driver further includes:
a multiplexer connected between an $M^{th}$ (M being a positive integer) signal transmission unit and an $(M+1)^{th}$ signal transmission unit; and
a first demultiplexer connected between the $(M+1)^{th}$ signal transmission unit and an $(M+2)^{th}$ signal transmission unit, and
wherein each of the switchable channels further includes a second demultiplexer connected between the digital-to-analog converter and the output buffer.

13. The display device of claim 12, wherein the multiplexer is configured to transmit pixel data from the $M^{th}$ signal transmission unit to the $(M+1)^{th}$ signal transmission unit in response to the second logic value of the control signal, and transmit the pixel data from the $M^{th}$ signal transmission unit is transferred to the first demultiplexer in response to the first logic value of the control signal, and
wherein the first demultiplexer is configured to transmit the pixel data from the $(M+1)^{th}$ signal transmission unit to the $(M+2)^{th}$ signal transmission unit in response to the second logical value of the control signal, and transmit the pixel data from the $M^{th}$ signal transmission unit to the $(M+2)^{th}$ signal transmission unit in response to the first logic value of the control signal.

14. The display device of claim 13, wherein the second demultiplexer includes:
a first input terminal connected to an output terminal of the digital-to-analog converter;
a second input terminal through which the black grayscale voltage is applied; and
an output terminal coupled to the output buffer,
wherein the second demultiplexer is configured to apply the data voltage from the digital-to-analog converter to the output buffer in response to the second logic value of the control signal, and apply the black grayscale voltage to the output buffer in response to the first logic value of the control signal.

15. A personal immersive system comprising:
a system controller configured to lower resolution of an input image in a non-focal region, which is outside a focal region than in the focal region to which a user's gaze is directed; and
a display driver configured to write pixel data of the focal region and pixel data of the non-focal region to pixels of a display panel, supply a black grayscale voltage to at least some of pixels of the non-focal region on the display panel, and generate a control signal for lowering luminance of the non-focal region than luminance of the focal region,
wherein at least a part of a screen of the display panel includes a switch element configured to connect adjacent sub-pixels to each other in response to a first logic value of the control signal and separate the adjacent sub-pixels from each other in response to a second logical value of the control signal.

16. The personal immersive system of claim 15, wherein the display panel includes:

a first display panel on which a left-eye image having a lower luminance in the non-focal region than in the focal region is displayed; and a second display panel on which a right-eye image having a lower luminance in the non-focal region than in the focal region is displayed.

17. A mobile terminal system comprising:

a system controller configured to lower resolution of an input image in a non-focal region, which is outside a focal region, than in the focal region to which a user's gaze is directed; and a display driver configured to write pixel data of the focal region and pixel data of the non-focal region to pixels of a display panel, supply a black grayscale voltage to at least some of pixels of the non-focal region on the display panel, and generate a control signal for lowering luminance of the non-focal region than luminance of the focal region, wherein at least a part of a screen of the display panel includes a switch element configured to connect adjacent sub-pixels to each other in response to a first logic value of the control signal and separate the adjacent sub-pixels from each other in response to a second logical value of the control signal.

18. The mobile terminal system of claim 17, wherein a left-eye image having a lower luminance in the non-focal region than in the focal region and a right-eye image having a lower luminance in the non-focal region than in the focal region are displayed on the display panel.

\* \* \* \* \*